Feb. 11, 1969 J. D. MIDDLETON 3,427,541
CATHODE RAY TUBE DISPLAY OSCILLOSCOPE INCLUDING MEANS
FOR APPLYING VOLTAGES TO A PAIR OF ADDITIONAL
DEFLECTING PLATES FOR PRODUCING A TIME SCALE
HAVING A PLURALITY OF DIVISIONS EXTENDING
FROM THE DISPLAYED WAVEFORM
Filed Sept. 9, 1966

INVENTOR
John David Middleton
BY
Baldwin, Wight, Diller & Brown
ATTORNEY

United States Patent Office 3,427,541
Patented Feb. 11, 1969

3,427,541
CATHODE RAY TUBE DISPLAY OSCILLOSCOPE INCLUDING MEANS FOR APPLYING VOLTAGES TO A PAIR OF ADDITIONAL DEFLECTING PLATES FOR PRODUCING A TIME SCALE HAVING A PLURALITY OF DIVISIONS EXTENDING FROM THE DISPLAYED WAVEFORM
John David Middleton, Cuffley, England, assignor to Marconi Instruments Limited, English Electric House, Strand, London, England, a British company
Filed Sept. 9, 1966, Ser. No. 578,359
Claims priority, application Great Britain, Sept. 20, 1965, 39,998/65
U.S. Cl. 324—121     2 Claims
Int. Cl. G01r 13/20

This invention relates to cathode ray tube display oscilloscope instruments and has for its object to provide improved display oscilloscope instruments of the kind in which wave forms are displayed against electronically produced scales.

Figure 1:
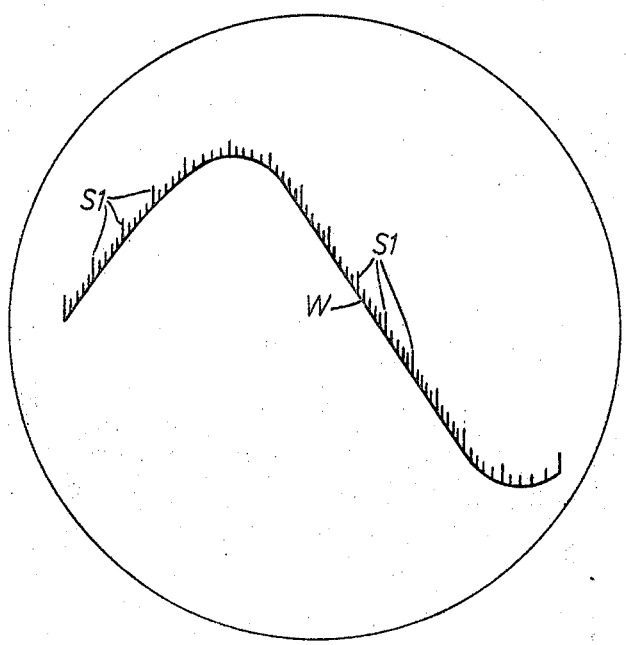

In the examination and measurement of wave forms the requirement often arises of displaying a wave form on a cathode ray tube screen on which is also displayed an electronically produced measuring scale which may often have to have very closely spaced divisions. The at present usual from of such a scale is one which lies along one of the co-ordinate axes of the tube, e.g. the X or time axis. FIGURE 1 of the accompanying drawings shows, however, the general form of a considerably more convenient form of scale display which the present invention seeks to provide in a simple and reliable manner. In FIGURE 1 the curve W is a wave form—it might be, for example, one cycle of a high frequency wave expanded along the time scale until it stretches over practically the whole length of the X axis on the screen—and along this wave form is electronically produced a time scale the divisions of which are so spaced as to represent time intervals in relation to the wave form W, but which extend from the wave form itself. The time represented by the whole length of the scale S and spacings of the divisions along the said scale are, of course, chosen to suit the wave form being examined. Thus, to quote a practical case, the main divisions S1 of the scale might be required to correspond to a frequency of, say, 10 mc./s. and the interval between two successive main divisions might be required to be divided into 10 sub-divisions so that the sub-divisions would occur at intervals corresponding to a frequency of 100 mc./s. This is only an example, for obviously the time scale displayed must be chosen to suit the time occupied by the length of wave form to be displayed for the frequency of the said wave form might be of any value within a very wide range which the oscilloscope instrument is designed to handle. The present invention seeks to satisfy requirements such as the foregoing and to provide improved and simple oscilloscope arrangements adapted to provide displays of the nature of that of FIGURE 1.

According to this invention an oscilloscope instrument comprises a cathode ray display tube having at least two pairs of electro-static deflecting plates adapted to deflect the ray in the tube in one co-ordinate direction, at least one pair of electro-static deflection plates adapted to deflect said ray in the other co-ordinate direction, means for applying a voltage representative of a wave form to be examined between the plates of one of said two pairs, means for applying a votlage of a pre-determined frequency and pre-determined amplitude to one of the plates of the other of said two pairs, means for applying a voltage of a different pre-determined frequency which is in fixed relation to the first predetermined frequency to the other plate of said other of said two pairs, and means for applying sweep voltage between the plates of said one pair.

Preferably the amplitudes of the voltages applied to the two plates of said other of said two pairs are different.

Figure 2:
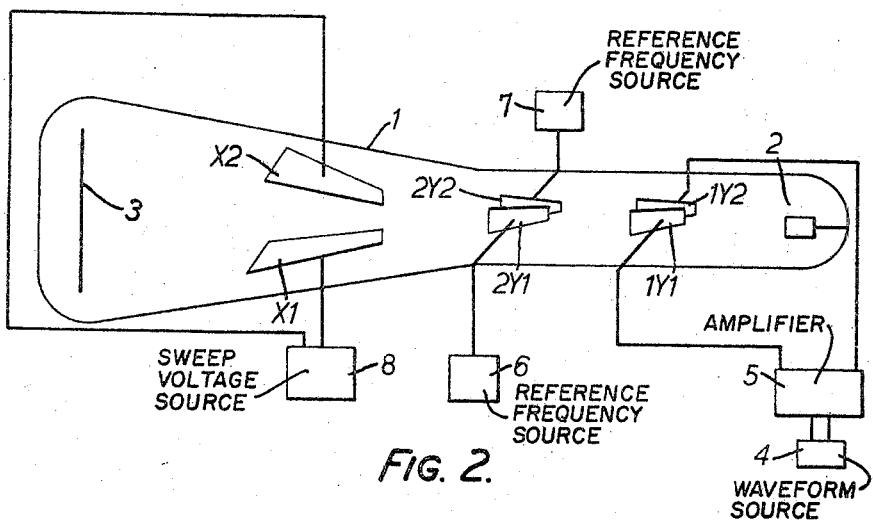

The invention is illustrated in FIGURE 2 of the accompanying drawings which shows in simplified diagrammatic form an oscilloscope instrument in accordance with this invention and adapted to produce a display like that shown in the accompanying FIGURE 1.

Referring to the drawing, the cathode ray display tube forming part of the instrument therein shown is of a kind known per se. It includes, within an evacuated envelope 1, an electron gun 2, a first pair of Y-deflecting plates 1Y1, 1Y2, a second pair of Y-deflecting plates 2Y1, 2Y2, a pair of X-deflecting plates X1 and X2 and a fluorescent screen 3 which is normally on the end wall of the tube but is shown for convenience of drawing as displaced therefrom.

The waveform to be examined is provided from a source represented by the block 4 and is applied via a push-pull amplifier 5 between the plates 1Y1 and 1Y2. A voltage of a pre-determined frequency chosen to suit the frequency of the waveform to be examined is applied from a source 6 of pulses occurring at that frequency to the plates 2Y1. These pulses are of pre-determined amplitude and they produce the main divisions, such as S1, of FIGURE 1. A second voltage is applied from a source 7 to the plate 2Y2. This voltage is of a frequency higher than and in desired fixed relation to the frequency of the source 6. Normally it will be ten times the frequency from source 6. The voltage applied to the plate 2Y2 may be in the form of pulses but if the frequency to be applied to the said plate 2Y2 is too high for the convenient production of pulses at this frequency, a sine wave voltage of the said frequency may be applied to the plate 2Y2 from the source 7. To repeat the exemplary figures given in connection with FIGURE 1 the frequency from the source 6 might be 10 mc./s. and the frequency from the source 7, 100 mc./s., in which case the voltage applied from the source 7 would normally be an alternating sine wave voltage.

The voltage from the source 7 produces the sub-divisions of the scale S of FIGURE 1. In practice the sources 6 and 7 are interlinked in any convenient known way to ensure the required frequency relation though, for simplicity in drawing, an interlink is not shown in FIGURE 2. Sweep voltage from a source 8 is applied between the plates X1 and X2.

The waveform to be examined might, in the case of a practical wide range instrument be of any frequency from D.C. up to, say 100 mc./s. and accordingly provision (not shown) is made for suitably adjusting and changing the frequencies applied to the various deflecting plates in accordance with well known practice in multi-range oscilloscope instruments.

In normal practice the Y-plates are considerably smaller than the X-plates but this is not of course a necessity. The deflecting plates in the tube shown in FIGURE 2 are of the familiar tapered divergent form.

I claim:
1. An oscilloscope instrument adapted to display a waveform having a scale on the waveform itself said instrument comprising a cathode ray display tube having at least two pairs of electro-static deflecting plates adapted to deflect the ray in the tube in one co-ordinate direction, at least one pair of electro-static deflection plates adapted to deflect said ray in the other co-ordinate direction, means for applying a voltage representative of a waveform to be examined between the plates of one of said two pairs, means for applying a voltage of a pre-determined frequency and pre-determined amplitude to one of the plates of the other of said two pairs, means for applying a voltage of a different pre-determined frequency which is in fixed relation to the first pre-determined frequency to the other plate of said other of said two pairs, and means for applying sweep voltage between the plates of said one pair, whereby upon application of the voltages of predetermined frequency, a time scale having a plurality of divisions extending from the waveform is electronically produced.

2. An instrument as claimed in claim 1 wherein the amplitudes of the voltages applied to the two plates of said other of said two pairs are different.

References Cited

UNITED STATES PATENTS

| | | | |
|---|---|---|---|
| 2,011,260 | 8/1935 | Prinz | 315—25 XR |
| 2,130,134 | 9/1938 | Iams | 315—25 XR |
| 2,137,202 | 11/1938 | Federmann et al. | 313—78 |
| 2,213,172 | 8/1940 | Sherman | 315—25 XR |
| 2,623,196 | 12/1952 | Toulon | 315—26 |
| 2,728,873 | 12/1955 | McNaney | 313—77 XR |
| 2,782,380 | 2/1957 | Coate et al. | 324—77 XR |
| 2,911,557 | 11/1959 | Mollen et al. | 313—77 XR |
| 3,019,389 | 1/1962 | Ross et al. | 324—121 XR |
| 3,210,656 | 10/1965 | Lent. | |
| 3,354,392 | 11/1967 | Newell | 324—121 |

OTHER REFERENCES

Steinberg, Gated Time Markers for CRO Display, Electronics, March 1954, pp. 150–151.

Wilson, Phase-Locked Marker Improves Spectrum Analyzer's Accuracy, Electronics, Feb. 7, 1966, vol. 39, No. 3 pp. 88–92.

RUDOLPH V. ROLINEC, *Primary Examiner.*

G. R. STRECKER, *Assistant Examiner.*

U.S. Cl. X.R.

313—76; 315—25; 324—88